(12) United States Patent
Kerselaers et al.

(10) Patent No.: US 11,108,437 B1
(45) Date of Patent: Aug. 31, 2021

(54) NEAR-FIELD COMMUNICATIONS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/919,815

(22) Filed: Jul. 2, 2020

(51) Int. Cl.
*H04B 5/02* (2006.01)
*H04B 5/00* (2006.01)

(52) U.S. Cl.
CPC ............ *H04B 5/02* (2013.01); *H04B 5/0012* (2013.01); *H04B 5/0081* (2013.01)

(58) Field of Classification Search
CPC .............................. H04B 5/02; H04B 5/0081
See application file for complete search history.

(56) References Cited

U.S. PATENT DOCUMENTS

| | | | |
|---|---|---|---|
| 9,125,007 B2 | 9/2015 | Konanur et al. | |
| 9,197,986 B1 | 11/2015 | Kerselaers et al. | |
| 9,520,648 B2 | 12/2016 | Wu | |
| 9,685,690 B2 | 6/2017 | Samardzija et al. | |
| 9,819,075 B2 | 11/2017 | Kerselaers et al. | |
| 9,819,097 B2 | 11/2017 | Kerselaers et al. | |
| 10,559,873 B2 | 2/2020 | Kang et al. | |
| 10,763,572 B2 | 9/2020 | Tsai et al. | |
| 10,917,137 B2 | 2/2021 | Antonetti | |
| 2010/0127799 A1* | 5/2010 | Bauer | H03H 9/0557 333/195 |
| 2010/0315206 A1* | 12/2010 | Schenk | A61B 5/0024 340/286.01 |
| 2015/0318603 A1 | 11/2015 | Kerselaers et al. | |
| 2015/0319545 A1 | 11/2015 | Kerselaers et al. | |
| 2016/0216301 A1* | 7/2016 | Holzworth | G01R 27/16 |
| 2017/0062949 A1 | 3/2017 | Kerselaers et al. | |
| 2017/0272128 A1 | 9/2017 | Tanaka | |
| 2017/0324170 A1 | 11/2017 | Kerselaers et al. | |
| 2019/0296439 A1 | 9/2019 | Kerselaers et al. | |
| 2019/0363459 A1 | 11/2019 | Geens et al. | |
| 2020/0083962 A1 | 3/2020 | Gommé et al. | |

OTHER PUBLICATIONS

Zimmerman, T.G.; Personal Area Networks: Near-field intrabody communicaiton; IBM Systems Journal, vol. 35; pp. 609-617 (1996).
IEEE Computer Society; "IEEE Standard for Local and metropolitan area networks—Part 15.6: Wireless Body Area Networks"; 271 pages (Feb. 29, 2012).
U.S. Appl. No. 16/781,050; 36 pages (dated Feb. 4, 2020).
U.S. Appl. No. 16/912,094; Notice of Allowance; 9 pages; dated Mar. 12, 2021.
U.S. Appl. No. 16/912,094, 30 pages, dated Jun. 25, 2020.

* cited by examiner

Primary Examiner — Hsinchun Liao (57) ABSTRACT

One example discloses a near-field device, including: a conductive housing physically coupled to the near-field device; a near-field antenna, having a first feed point and a second feed point, and including, a first inductive coil having a first end coupled to the first feed point, a second end coupled to the second feed point, and a connection point; a conductive plate capacitively coupled to the conductive housing, and coupled to the first end of the first inductive coil; a tuning circuit; a reference potential; wherein another end of each of the capacitance banks and another end of each of the resistance banks are coupled to the reference potential; wherein the connection point is galvanically coupled to the reference potential; and wherein the conductive housing is galvanically coupled to the reference potential.

19 Claims, 5 Drawing Sheets

NEAR-FIELD COMMUNICATIONS DEVICE

The present specification relates to systems, methods, apparatuses, devices, articles of manufacture and instructions for a near-field device.

SUMMARY

According to an example embodiment, a near-field device, comprising: a conductive housing physically coupled to the near-field device; a near-field antenna, having a first feed point and a second feed point, and including, a first inductive coil having a first end coupled to the first feed point, a second end coupled to the second feed point, and a connection point; a conductive plate capacitively coupled to the conductive housing, and coupled to the first end of the first inductive coil; a tuning circuit coupled to the first and second feed points, and including, a first capacitance bank, a second capacitance bank, a first resistance bank, and a second resistance bank; wherein one end of each of the capacitance banks and one end of each of the resistance banks are coupled to either the first feed point or the second feed point; a reference potential; wherein another end of each of the capacitance banks and another end of each of the resistance banks are coupled to the reference potential; wherein the connection point is galvanically coupled to the reference potential; and wherein the conductive housing is galvanically coupled to the reference potential; wherein the first inductive coil is configured to receive or transmit near-field magnetic signals; and wherein the conductive plate and the conductive housing are configured to receive or transmit near-field electric signals.

In another example embodiment, a voltage at the connection point is zero Volts.

In another example embodiment, a voltage at the connection point is same as a voltage at the reference potential.

In another example embodiment, the reference potential is a ground potential.

In another example embodiment, the near-field device includes only one conductive plate.

In another example embodiment, the first inductive coil is wrapped around the conductive housing.

In another example embodiment, the first inductive coil is completely wrapped around an outside of the conductive housing.

In another example embodiment, further comprising a ferrite sheet between first inductive coil and the conductive housing.

In another example embodiment, further comprising a transceiver coupled to the tuning circuit, the first feed point and the second feed point; and wherein the transceiver includes only one low noise amplifier (LNA) and/or power amplifier connected to first and second feed points.

In another example embodiment, the conductive plate is at a distance D1 from the conductive housing, resulting in a capacitance Ca1; the conductive housing is configured to be at a distance D2 from a user; and D2 is less than D1.

In another example embodiment, $C_{a1}$ in Farads=$(A_1 \epsilon_o \epsilon_{r1})/D_1$, where: $A_1$=effective surface area of the conductive plate; $D_1$=distance between the conductive plate and the conductive housing; $\epsilon_o$=permittivity of free space; and $\epsilon_{r1}$=relative permittivity of a material between the conductive plate and the conductive housing; and the material is a non-ferrite substrate.

In another example embodiment, the first capacitance bank has a capacitance C1; the second capacitance bank has a capacitance C2; V is a voltage across the first and second feed points; and V=Ve Q Ce/(Ce+CT), where: Ve=equivalent voltage induced in capacitance Ce in Volts; Q=quality factor of the antenna system; Ce=equivalent capacitance across the first and second feed points formed by capacitance Ca1; and CT=a series summation of capacitances C1 and C2.

In another example embodiment, the user is at least one of: a human's body, an animal's body, a body of a living organism, a body structure of an inanimate object, a robot, a vehicle, a docking system, a physical coupling system, and/or a station on an assembly line.

In another example embodiment, further comprising a controller; wherein the first and second capacitance banks are variably tunable by the controller; and wherein the first and second resistance banks are variably tunable by the controller.

In another example embodiment, further comprising a second inductive coil, having a first end electrically coupled to either end of the first inductive coil, and having a second end electrically coupled to the conductive plate.

In another example embodiment, the first inductive coil has a planar geometry.

In another example embodiment, the planar geometry of the second inductive coil is formed in a shape including: a circle, a rectangle, a polygon, an oval, or a diamond.

In another example embodiment, the conductive plate is configured to have a voltage 180 degrees out of phase with respect to the reference potential.

In another example embodiment, the device is embedded in at least one of: a glucose sensor, a wearable device; a smart watch; a smartwatch housing, a wireless mobile device, an earbud, a hearing aid, a headphone, an activity tracker, or a heart rate monitor.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMINFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, in alternate embodiments the near-field device 100, body is herein broadly defined to include at least: a human's body, an animal's body, a body of a living organism, a body structure of an inanimate object, a robot, a vehicle, a docking system, a physical coupling system, a station on an assembly line, and so on.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

In some applications, various portions of the near-field device may be enclosed in or electrically blocked by a conductive housing that may reduce normal near-field communications since the conductive housing forms a Faraday Cage.

Now discussed are example embodiments of near-field devices having portions enclosed or that would otherwise be electrically blocked by such conductive housings, but that using the teachings below can nonetheless still effectively communicate using near-field communications. In some example embodiments the housing may have a window to allow for better far field (e.g. WiFi, Bluetooth, etc.) communication and/or magnetic near-field communication.

Figure 1:
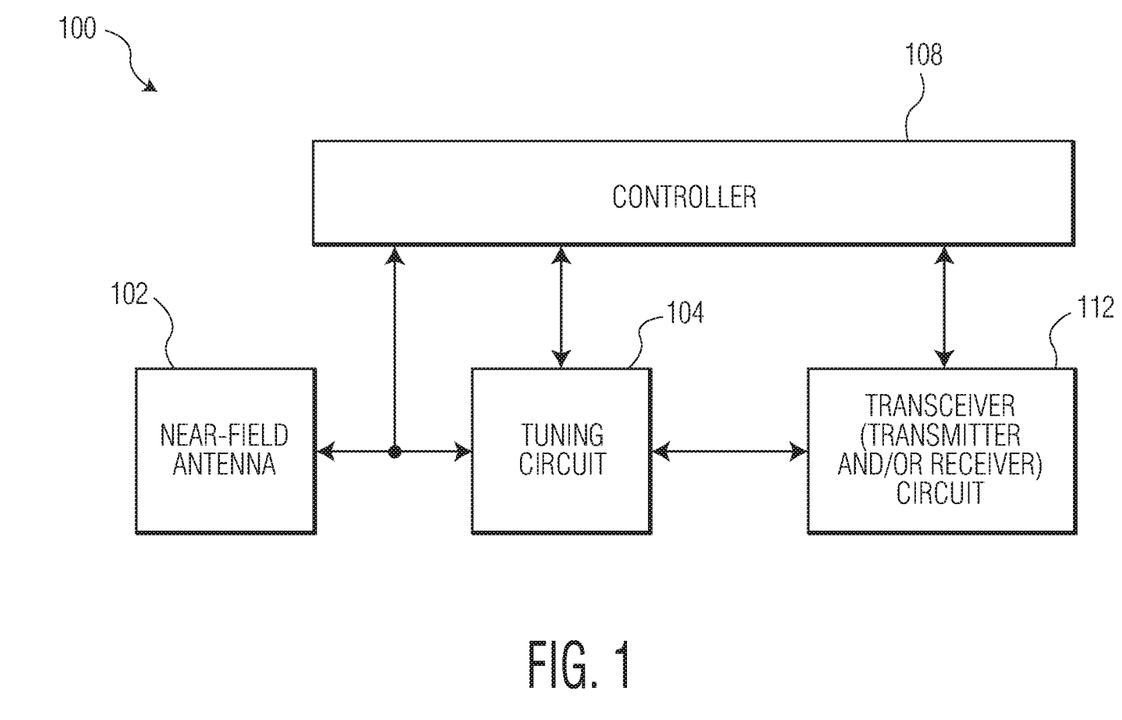
FIG. 1 is an example of a near-field wireless device.

FIG. 1 is an example of a near-field wireless device 100. The example near-field wireless device 100 includes a near-field antenna 102, a tuning circuit 104, a controller 108 and a transceiver circuit 112.

The controller 108 is configured to monitor and maintain the device's 100 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The tuning circuit 104 is configured to adjust the device's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

In some example embodiments, the transceiver circuit 112 is configured to inject test signals (e.g. three test signals) into the tuning circuit 104 and the antenna 102. The controller 108 is then configured to: first, monitor a loading of the near-field antenna 102, and adjust the tuning parameters if the loading is different from a preselected loading.

Figure 2:
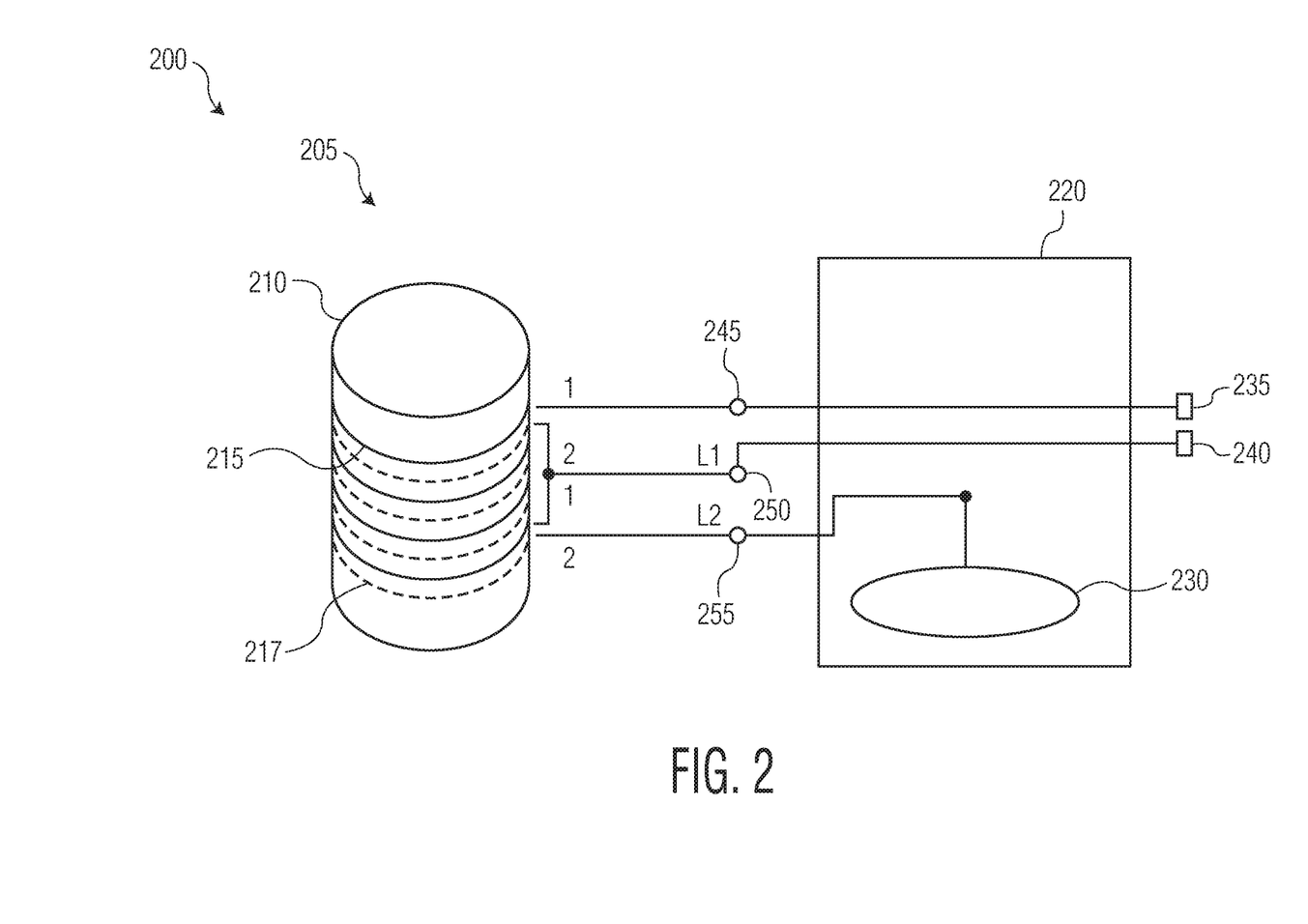
FIG. 2 is an example dual-coil NFEMI antenna.

FIG. 2 is an example dual-coil NFEMI antenna 200 included within the near-field antenna 102 of the near-field wireless device 100. The antenna 200 includes a short loaded dipole portion 220 with a conductive loading plate 230 and a small loop antenna 205.

The small loop antenna includes at least two coupled coils 215 and 217. The first coil 215 has an inductance of L1, and the second coil 217 has an inductance of L2. Both coils 215 and 217 may be connected, at connection point 250, such that they form a larger inductance compared with the inductance of the first coil 215 and the second coil 217.

Both coils 215, 217 may be air coils, wrapped around a ferrite core 210 or they can be in the form of a planar structure. In the ferrite core 210 version, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217. Additional embodiments of these coils 215, 217 are discussed below.

Connection point 245 couples one end of the first coil 215 to a first feeding point 235. Connection point 250 couples another end of the first coil 215 to one end of the second coil 217 and to a second feeding point 240. Connection point 255 couples another end of the second coil 217 to the conductive loading plate 230 of the small loaded dipole 220.

Figure 3:
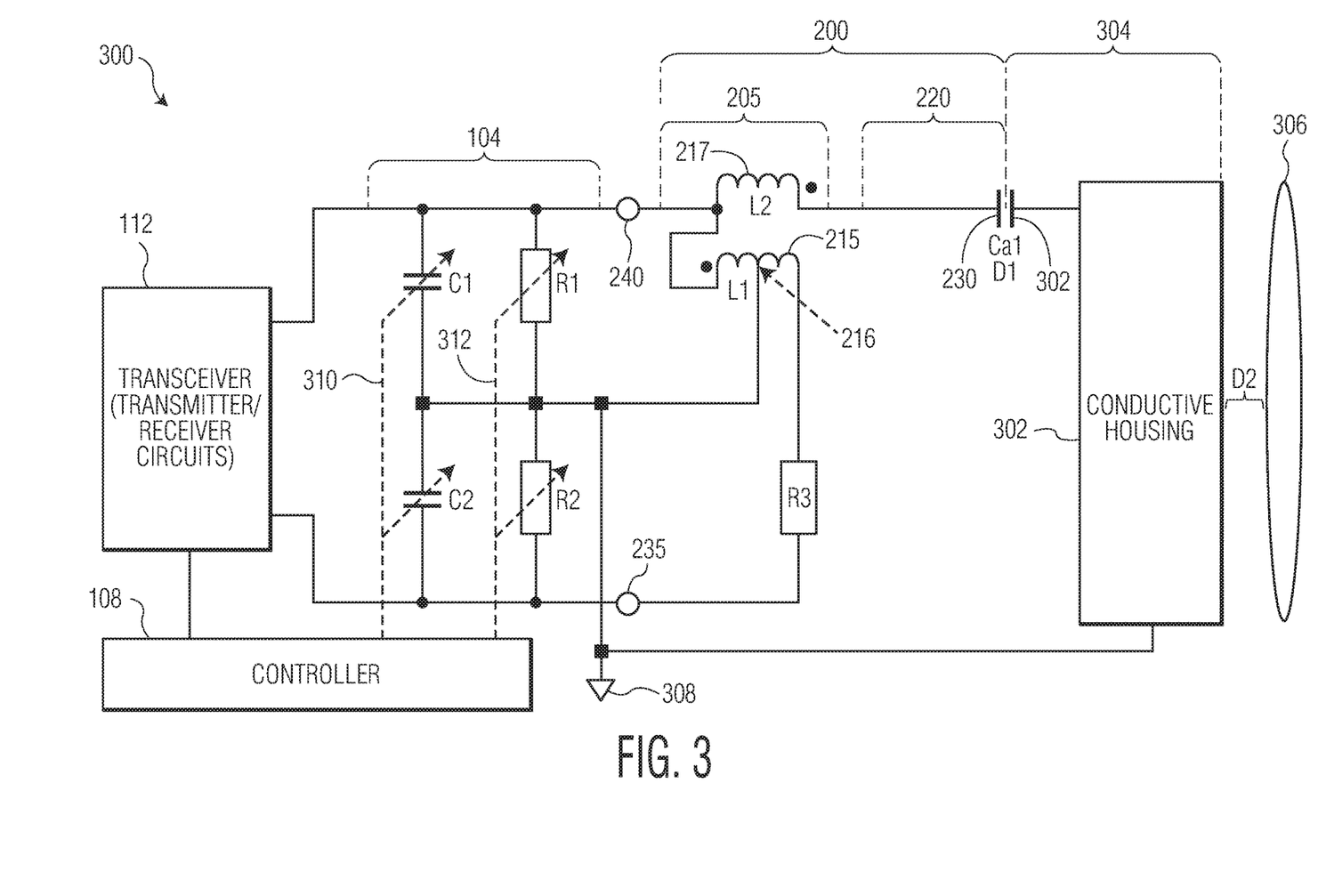
FIG. 3 is an example circuit diagram of the near-field wireless device.

FIG. 3 is an example circuit diagram 300 of the near-field wireless device 100. The example circuit 300 shows an idealized electrical equivalent of the dual-coil near-field antenna 200, the tuning circuit 104, the controller 108 and the transceiver circuit 112.

The near-field antenna 102 includes the coil (H-field) antenna 205 having a resistance (R3) and including the inductance (L1) 215, and the inductance (L2) 217. In some example embodiments the near-field antenna 102 includes only one inductance (L1) 215.

The inductances 215, 217 may be helical or planar and surrounding or attached to a ferrite material or on another carrier material. Less looped conductors are required for the same inductance when they are attached to a ferrite material. The inductance (L2) 217 provides an increase in a transmit voltage compared with an output voltage of a power amplifier in the transceiver circuit 112 when in transmit-mode.

In some example embodiments there is only one inductance (L1) 215. Also, in some example embodiments, the coils 215, 217 are wrapped around an outside of the conductive housing 302 with a ferrite sheet between coils 215, 217 and the conductive housing 302. Such a wrapped around embodiment creates a very unique magnetic (H) field flux.

Placing the magnetic (H-field) antenna 205 outside of the conductive housing 302 has an advantage of eliminating various obstructions to the near-field magnetic field lines, such as by conductive parts in the near-field device 102 (e.g. printed circuit boards, electro mechanical components and other conductive structures that could create Eddy currents that generate magnetic field flux in opposition to the H-field signal flux responsive to the magnetic (H-field) antenna 205.

Also shown is the short loaded dipole (E-field) antenna 220 having a resistance (R4) (not shown) and including the conductive loading plate 230. In some example embodiments, the electric antenna includes only one conductive plate. The short loaded dipole (E-field) antenna 220 is further coupled to a conductive housing 302 which creates an extended electric (E-field) antenna 304. Feed points 235, 240 are also shown.

Capacitance (Ca1) is formed between the conductive loading plate 230 and the conductive housing 302, separated by a distance D1.

$C_{a1}$ in Farads=$(A_1 \epsilon_o \epsilon_{r1})/D_1$, where: $A_1$=effective surface area of plate 230 facing the housing 302 in meters; $D_1$=distance between plate 230 and the conductive housing 302 in meters; $\epsilon_o$=permittivity of free space Farad/meter; and $\epsilon_{r1}$=relative permittivity of material between plate 230 and the housing 302.

The conductive housing 302 is configured to be positioned at a distance D2 from a user 306. "User" is herein defined broadly to include: a person, a biological material, a robot, a vehicle, a docking system, a physical coupling system, a station on an assembly line, and other conductive structures.

In some example embodiments, the conductive plate 230 at distance (D2) is closer to the user 306 than distance ($D_1$) between the conductive plate 230 and the conductive housing 302. The conductive housing 302 and the conductive plate 230 are both capacitively coupled to the user 306.

The tuning circuit 104 is coupled to the first and second feed points 235, 240. The tuning circuit 104 includes a first variable tuning capacitance bank (C1), a second variable tuning capacitance bank (C2), a first variable tuning resistance bank (R1), and a second variable tuning resistance bank (R2). The capacitive banks are coupled to the controller 108 by control line 310, and the resistance banks are coupled to the controller 108 by control line 312.

The capacitance banks and resistance banks are coupled to a reference potential 308 (e.g. a ground potential). The conductive housing 302 and a connection point 216 of the inductance (L1) 215 are galvanically coupled to the reference potential 308.

The connection point 216 in some example embodiments is at a center point the inductance (L1) 215. If a voltage at the reference potential 308 is zero volts, then by placing the connection point 216 at the center point the inductance (L1) 215 enables the near-field signals received from and/or transmitted to the feed points 235, 240 to be balanced, even with just one conductive plate 230 in the electric (E-field) antenna 220.

The connection point 216 enables a simpler transceiver 112 that only requires one LNA and/or power amplifier connected to feed points 235 and 240 when there is only one conductive plate 230, and/or in other example embodiments with more than one conductive plate.

Without the connection point 216 the transceiver 112 would require two LNAs and/or power amplifiers. One connected to access a voltage between feed point 235 and the reference potential 308, and the other connected to access a voltage between the reference potential 308 and feed point 240.

The controller 108 adjusts the first and second capacitance banks (C1), (C2) to adjust a resonant frequency of the magnetic 205, the electric 220, and the extended electric 304 antennas (e.g. to 10.6 MHz). The controller 108 adjusts the first and second resistance banks (R1), (R2) to adjust a bandwidth of the magnetic 205, the electric 220, and the extended electric 304 antennas (e.g. to 400 KHz) sufficient to allow the non-propagating quasi-static near-field signal to be received from the antennas 205, 220, 304.

In some example embodiments, the capacitance banks (C1), (C2) are equally tuned using the control line 310 from the controller 108, and the resistance banks (R1), (R2) are equally tuned using the control line 312 from the controller 108, in other example embodiments they may be variably tuned.

When the transceiver circuit 112 is in receive mode, a received near-field magnetic signal induces a voltage in the inductance L1 215 and a received near-field electrical signal induces voltages in capacitor Ca1 which are then converted by L2 217 and the tuning circuit 104 into a voltage at a low noise amplifier (LNA) input in the transceiver circuit 112. The LNA is further connected to the other baseband receiver circuitry.

The voltage (V) at the input of the LNA in the transceiver circuit 112 due to just the enhanced near-field electric antenna is: V=Ve Q Ce/(Ce+CT), where: Ve=equivalent voltage induced in capacitance Ce in Volts; Q=quality factor of the antenna system 104, 200, 304; Ce=equivalent capacitance present at the tuning circuit 104 points 235 and 240 and formed by capacitance Ca1 in Farads; and CT=a series summation of capacitances C1 and C2 in Farads.

When the transceiver circuit 112 is in transmit mode, a voltage at an output amplifier in the transceiver circuit 112 sends a voltage to the inductance L1 215 thereby generating a transmitted near-field magnetic signal and sends voltages boosted by L2 217 to capacitor Ca1 thereby generating a transmitted near-field electrical signal.

Figure 4A:
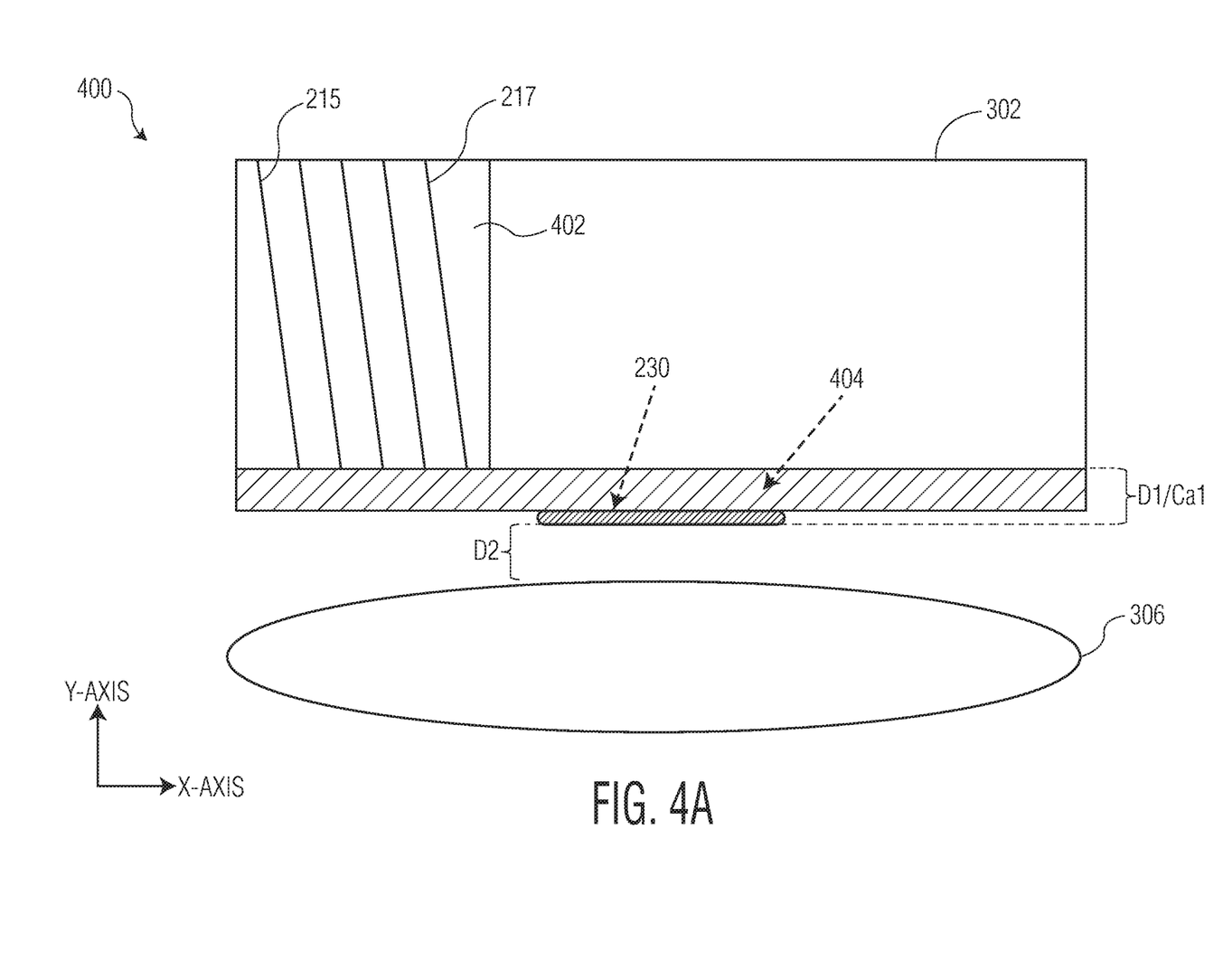
FIG. 4A is an example side view of the near-field device positioned near a user.

FIG. 4A is an example side view 400 of the near-field device 100 positioned near the user 306. The example 400 shows the conductive housing 302, a ferrite layer 402, a substrate 404, conductive plate 230 distances D1 and D2, and the user 306. In some example embodiments, all required electronics (e.g. tuning circuit 104, controller 108, transceiver circuit 112) of the device are integrated inside the conductive housing 302.

In some example embodiments the substrate 404 is a dielectric having a 4 mm thickness and a permittivity of 4.4. The conducting material (e.g. wire) of the inductances (L1) 215 and (L2) 217 may have a thickness of 0.15 mm. The inductances (L1) 215 and (L2) 217 are attached to the ferrite layer 402.

The ferrite layer 402 can have a thickness of 0.1 mm with a permeability of 150. The ferrite layer 402 is attached to the conductive (e.g. metal) housing 302. The conductive plate 230 is attached to the substrate 404. In some example embodiments the substrate 404 purpose is to increase the distance D1+D2 between the conductive housing 302 and the user 306 so as to improve the near-field electric (E-field) antenna's 220 signal strength.

The coils 215, 217 can be either helically wrapped around the conductive housing 302 and the ferrite material 402 or in a zig-zag pattern over the ferrite material 402 on one or more sides of the conductive housing 302.

Figure 4B:
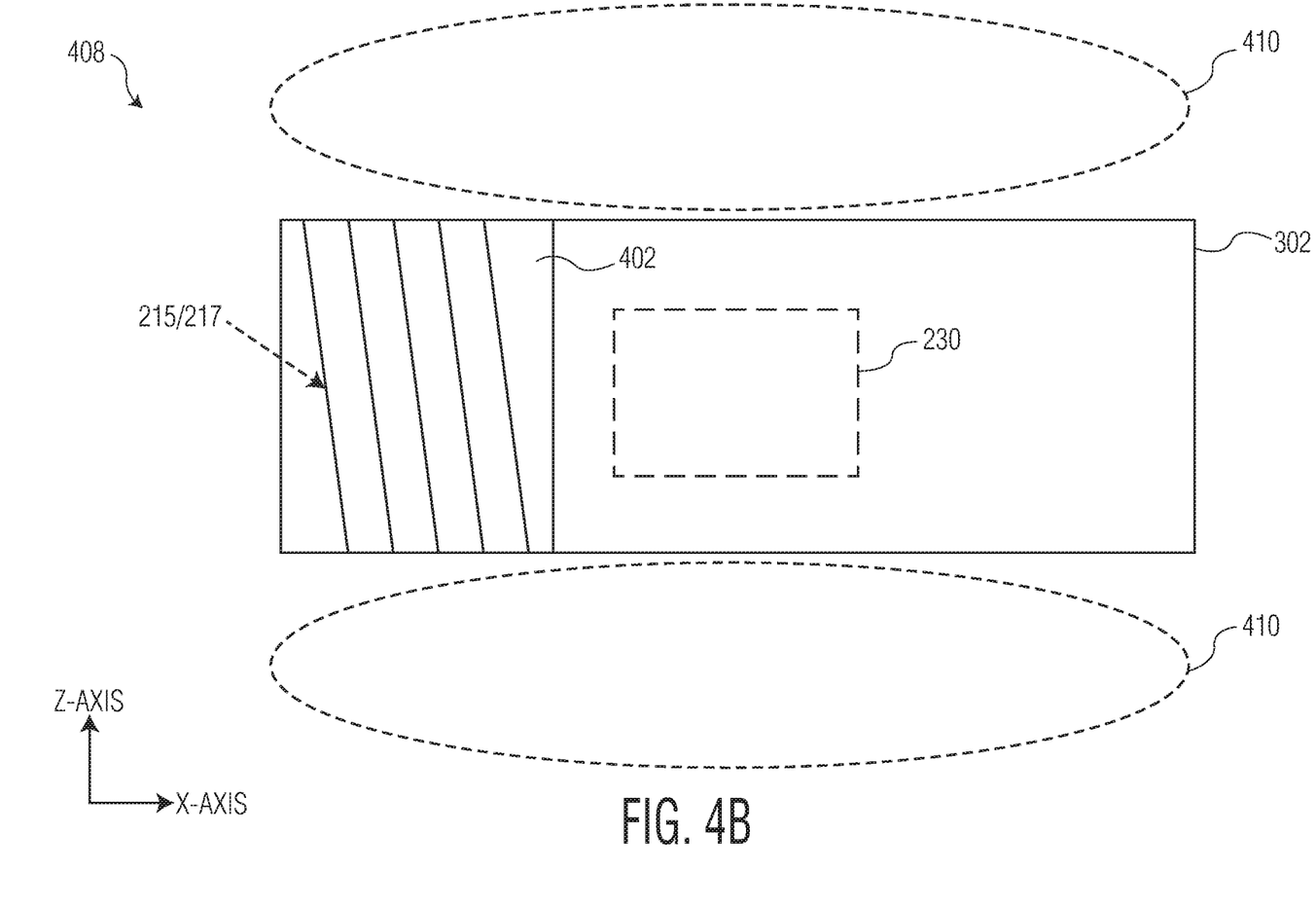
FIG. 4B is an example front view of the near-field device.

FIG. 4B is an example front view 408 of the near-field device 100. Here the substrate 404 the conductive plate 230 are on an opposite side of the conductive housing 302 and so the conductive plate 230 is shown as dashed.

In example embodiments, where one or both of the coils 215, 217 are helically wrapped around the conductive housing 302 and the ferrite material 402, the near-field magnetic (H) antenna 205 H-field flux lines 410 are equal on both sides of the conductive housing 302 as shown.

In various example embodiments, the near-field device 100 can be embedded in a medical device positioned on a human body. For example, as part of an insulin pump that corrects with regular intervals a glucose level of the body and that can also communicate across the body with another glucose level measuring near-field device. The near-field device 100 can also be embedded various wearable devices (e.g. earbuds, smartwatches, clothing sensors, etc.) for wireless on-body networks that require a small form factor.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field device, comprising:
a conductive housing physically coupled to the near-field device;
a near-field antenna, having a first feed point and a second feed point, and including,
   a first inductive coil having a first end coupled to the first feed point, a second end coupled to the second feed point, and a connection point;
   a conductive plate capacitively coupled to the conductive housing, and coupled to the first end of the first inductive coil;
a tuning circuit coupled to the first and second feed points, and including,
   a first capacitance bank, a second capacitance bank, a first resistance bank, and a second resistance bank;

wherein one end of each of the capacitance banks and one end of each of the resistance banks are coupled to either the first feed point or the second feed point;
a reference potential;
wherein another end of each of the capacitance banks and another end of each of the resistance banks are coupled to the reference potential;
wherein the connection point is galvanically coupled to the reference potential; and
wherein the conductive housing is galvanically coupled to the reference potential;
wherein the first inductive coil is configured to receive or transmit near-field magnetic signals; and
wherein the conductive plate and the conductive housing are configured to receive or transmit near-field electric signals.

2. The device of claim 1:
wherein a voltage at the connection point is zero Volts.

3. The device of claim 1:
wherein a voltage at the connection point is same as a voltage at the reference potential.

4. The device of claim 1:
wherein the reference potential is a ground potential.

5. The device of claim 1:
wherein the near-field device includes only one conductive plate.

6. The device of claim 1:
wherein the first inductive coil is wrapped around the conductive housing.

7. The device of claim 1:
wherein the first inductive coil is completely wrapped around an outside of the conductive housing.

8. The device of claim 1:
further comprising a ferrite sheet between first inductive coil and the conductive housing.

9. The device of claim 1:
further comprising a transceiver coupled to the tuning circuit, the first feed point and the second feed point; and
wherein the transceiver includes only one low noise amplifier (LNA) and/or power amplifier connected to first and second feed points.

10. The device of claim 1:
wherein the conductive plate is at a distance $D_1$ from the conductive housing, resulting in a capacitance Ca1;
wherein the conductive housing is configured to be at a distance D2 from a user; and
wherein D2 is less than D1.

11. The device of claim 10:
wherein $C_{a1}$ in Farads=$(A_1 \epsilon_o \epsilon_{r1})/D_1$, where: $A_1$=effective surface area of the conductive plate; $D_1$=distance between the conductive plate and the conductive housing; $\epsilon_o$=permittivity of free space; and $\epsilon_{r1}$=relative permittivity of a material between the conductive plate and the conductive housing; and
wherein the material is a non-ferrite substrate.

12. The device of claim 10:
wherein the first capacitance bank has a capacitance C1;
wherein the second capacitance bank has a capacitance C2;
wherein V is a voltage across the first and second feed points; and
wherein V=Ve Q Ce/(Ce+CT), where: Ve=equivalent voltage induced in capacitance Ce in Volts; Q=quality factor of the antenna system; Ce=equivalent capacitance across the first and second feed points formed by capacitance Ca1; and CT=a series summation of capacitances C1 and C2.

13. The device of claim 10:
wherein the user is at least one of: a human's body, an animal's body, a body of a living organism, a body structure of an inanimate object, a robot, a vehicle, a docking system, a physical coupling system, and/or a station on an assembly line.

14. The device of claim 1:
further comprising a controller;
wherein the first and second capacitance banks are variably tunable by the controller; and
wherein the first and second resistance banks are variably tunable by the controller.

15. The device of claim 1:
further comprising a second inductive coil, having a first end electrically coupled to either end of the first inductive coil, and having a second end electrically coupled to the conductive plate.

16. The device of claim 1:
wherein the first inductive coil has a planar geometry.

17. The device of claim 16:
wherein the planar geometry of the second inductive coil is formed in a shape including: a circle, a rectangle, a polygon, an oval, or a diamond.

18. The device of claim 1:
wherein the conductive plate is configured to have a voltage 180 degrees out of phase with respect to the reference potential.

19. The device of claim 1:
wherein the device is embedded in at least one of: a glucose sensor, a wearable device; a smart watch; a smartwatch housing, a wireless mobile device, an earbud, a hearing aid, a headphone, an activity tracker, or a heart rate monitor.

* * * * *